(12) United States Patent
Jacobs

(10) Patent No.: US 12,481,732 B2
(45) Date of Patent: Nov. 25, 2025

(54) PROTECTION, OBFUSCATION, AND OPTIMIZATION OF BINARY EXECUTABLES USING RECOMPILATION

(71) Applicant: Magic Shell Software, Inc., Olney, MD (US)

(72) Inventor: Anthony Samuel Jacobs, Olney, MD (US)

(73) Assignee: Magic Shell Software, Inc., Olney, MD (US)

( * ) Notice: Subject to any disclaimer, the term of this patent is extended or adjusted under 35 U.S.C. 154(b) by 195 days.

(21) Appl. No.: 18/338,863

(22) Filed: Jun. 21, 2023

(65) Prior Publication Data

US 2023/0418576 A1  Dec. 28, 2023

Related U.S. Application Data

(60) Provisional application No. 63/354,468, filed on Jun. 22, 2022, provisional application No. 63/354,555, filed on Jun. 22, 2022.

(51) Int. Cl.
| | |
|---|---|
| *G06F 21/14* | (2013.01) |
| *G06F 8/41* | (2018.01) |
| *G06F 8/53* | (2018.01) |
| *G06F 12/14* | (2006.01) |
| *G06F 21/60* | (2013.01) |

(52) U.S. Cl.
CPC .............. *G06F 21/14* (2013.01); *G06F 8/44* (2013.01); *G06F 8/53* (2013.01); *G06F 12/1408* (2013.01); *G06F 12/1441* (2013.01); *G06F 21/602* (2013.01); *G06F 2212/1052* (2013.01)

(58) Field of Classification Search
CPC ... G06F 8/44; G06F 8/71; G06F 9/445; G06F 21/14; G06F 21/602; G06F 2212/1052; G06F 12/1408; G06F 12/1441
See application file for complete search history.

(56) References Cited

U.S. PATENT DOCUMENTS

| | | | |
|---|---|---|---|
| 6,334,189 B1 * | 12/2001 | Granger | G06F 21/14 380/255 |
| 10,140,436 B1 * | 11/2018 | Mahamuni | G06F 21/14 |

(Continued)

FOREIGN PATENT DOCUMENTS

| | | | | |
|---|---|---|---|---|
| CA | 2293650 C | * | 9/2012 | ............ G06F 21/14 |
| EP | 3522006 A1 | * | 8/2019 | |

(Continued)

OTHER PUBLICATIONS

Kang, Seoyeon, et al., OBFUS: An Obfuscation Tool for Software Copyright and Vulnerability Protection, CODASPY '21, Apr. 26-28, 2021, 3 pages, [retrieved on Jan. 21, 2025], Retrieved from the Internet: <URL:http://dl.acm.org/>.*

*Primary Examiner* — Geoffrey R St Leger
(74) *Attorney, Agent, or Firm* — Seed Intellectual Property Law Group LLP

(57) ABSTRACT

A facility for protecting executables is described. The facility accesses a first executable representation of a program and decompiles it to obtain an intermediate representation of the program. The facility obfuscates the intermediate representation of the program, and recompiles the obfuscated intermediate representation of the program to obtain a second executable representation of the program.

28 Claims, 6 Drawing Sheets

(56) References Cited

U.S. PATENT DOCUMENTS

| | | | | |
|---|---|---|---|---|
| 2007/0039048 A1* | 2/2007 | Shelest | ............... | G06F 21/566 |
| | | | | 726/22 |
| 2009/0307500 A1* | 12/2009 | Sato | ............... | G06F 21/14 |
| | | | | 713/190 |
| 2013/0086550 A1* | 4/2013 | Epstein | ............... | G06F 9/455 |
| | | | | 717/110 |
| 2015/0363294 A1* | 12/2015 | Carback, III | ............... | G06F 8/70 |
| | | | | 717/132 |
| 2015/0363580 A1* | 12/2015 | Betouin | ............... | G06F 21/14 |
| | | | | 726/26 |
| 2017/0116396 A1* | 4/2017 | Gu | ............... | G06F 8/41 |
| 2019/0371209 A1* | 12/2019 | Gounares | ............... | G06F 8/52 |

FOREIGN PATENT DOCUMENTS

| | | | | |
|---|---|---|---|---|
| WO | WO-0077597 A1 * | 12/2000 | ............ | G06F 21/14 |
| WO | WO-2009108245 A2 * | 9/2009 | ............ | G06F 21/10 |

* cited by examiner

PROTECTION, OBFUSCATION, AND OPTIMIZATION OF BINARY EXECUTABLES USING RECOMPILATION

CROSS-REFERENCE TO RELATED APPLICATION(S)

This application claims the benefit and priority to each of U.S. Provisional Application No. 63/354,468, filed Jun. 22, 2022, and U.S. Provisional Application No. 63/354,555, filed Jun. 22, 2022, each of which is hereby incorporated by reference in its entirety.

This application is related to U.S. Pat. No. 18,339,004 (patent counsel's docket number 490081.402), entitled "PROTECTION OF BINARY EXECUTABLES USING DYNAMIC ENCRYPTION TECHNIQUES", filed concurrently herewith, which is hereby incorporated by reference in its entirety.

In cases where the present application conflicts with a document incorporated by reference, the present application controls.

BACKGROUND

The standard procedure to perform an obfuscation on a binary is to inject an Obfuscation Tool into the build chain. This Obfuscation Tool will often work by analyzing the raw source code and convert that into some other equivalent source code, and then proceed with compilation. Other versions of the Obfuscation Tool may operate on the Intermediate Representation at compilation time and do this equivalent code replacement before proceeding to Executable Binary.

DETAILED DESCRIPTION

Terminology

Figure 1:
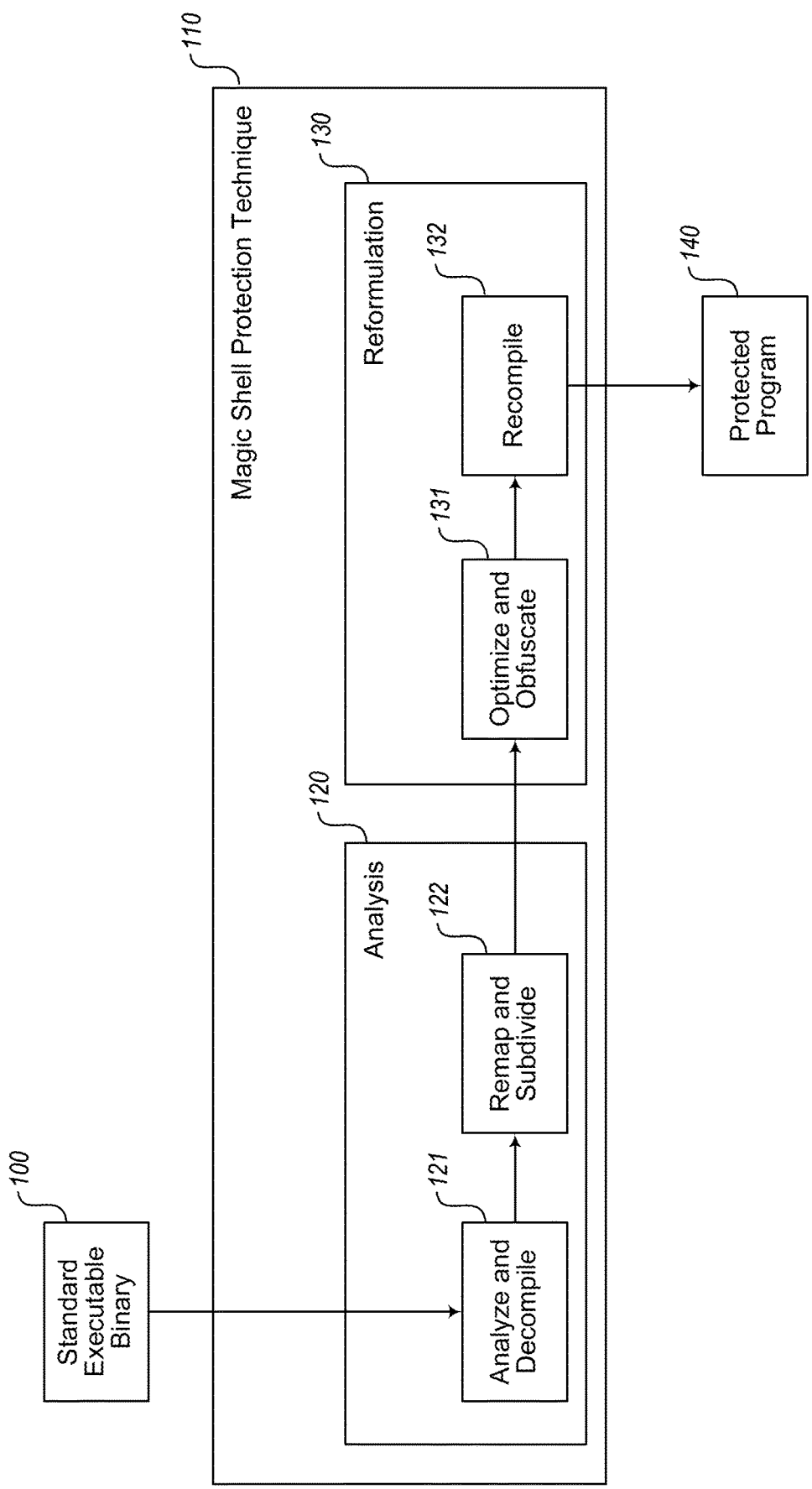
FIG. 1 is a flow diagram showing the complete Magic Shell Protection Technique performed by the facility in some embodiments.

An executable binary is a runnable program designed to execute on a processing platform. A standard executable binary is one that has not been protected, obfuscated, and optimized as described herein.

For this discussion, Compilation is a two-part process to turn source code from high-level programming language into an intermediate representation and then on to an executable binary. An Intermediate Representation is a data structure such as an abstract syntax tree or similar low-level programming language and/or data structure. Decompilation is a limited inverse of this process, taking an executable binary and translating it into an Intermediate Representation.

Methodology

The inventor has recognized that conventional obfuscation techniques are fragile and extremely sensitive to the high-level languages in use as well as the entire compiler build chain. This type of obfuscation generally requires significant developer involvement and customization.

In response to recognizing these disadvantages of conventional obfuscation techniques, the inventor has conceived and reduced to practice a software and/or hardware facility for the protection, obfuscation, and optimization of binary executables using recompilation, sometimes referred to as "Magic Shell" herein.

The protection technique used by Magic Shell is to instead analyze and decompile the binary to create a new Intermediate Representation for the program, using the same representation used as a platform-specific compiler. At this point, the Intermediate Representation allows for straightforward generation of a logic tree for the overall structure of the software. This logic tree is then Mapped into modules, representing functions, classes, or other related compilation units, taking cues from the original program layout. These module boundaries will be useful for other Magic Shell processing such as Dynamic Encryption, described in U.S. Provisional Patent Application No. 63/354,468.

Each module then undergoes Subdivide Analysis to find basic blocks of logic and a control flow data structure. This subdivided modular structure allows Magic Shell to analyze the basic blocks and apply standard code performance optimization techniques such as loop unrolling, dead assignment elimination, deferred variable assignment, and stack-based allocation to the source program. As a result of this, the fundamental performance of the code is potentially improved before beginning the recompilation process. By using the Intermediate Representation from the platform-specific compiler, the optimizations can be generated ahead of time and be tuned for the specific platform.

Obfuscation analysis then occurs to change these common basic blocks of the intermediate representation to perform equivalent idiom replacement of machine-specific code elements. This equivalent idiom is chosen from among one or more functionally identical alternatives that are constructed for the target machine code architecture. Once each module has been reformulated, it is randomly reordered while updating internal mapping addresses, thus causing the overall program structure to be changed while maintaining the logical structure.

The overall control flow is then holistically analyzed across all modules and code blocks. Unused basic blocks may be discarded. Additional basic blocks are added as distractions by introducing unreachable logic into the existing control flow. The entire process may repeat to ensure that all distraction blocks appear to be valid control flow logic for analysis tools, and to maximize the fan out of simple statements from the original source code into obfuscated code in the result.

Finally, the modules written into a new binary, which represents the recompiled and obfuscated target machine code as a protected executable binary.

FIG. 1 is a flow diagram showing the complete Magic Shell Protection Technique performed by the facility in some embodiments.

The input into the protection, optimization, and obfuscation process is a standard executable binary 100. This binary will be encoded as a normal executable for the host operating system; e.g., as ELF for modern UNIX-like, server, embedded, and mobile systems; PE/COFF on Windows; and Mach-O for other modern UNIX-like desktop and mobile systems. In some embodiments, the input also contains extended symbol information, detailed debug information including parameter types, call stacks, or runtime heap information, or other references to the underlying compilation environment. In some embodiments, the source code is available for cross-reference and developer convenience; however this process operates primarily on the executable binary and is not acting as a traditional compiler.

The Magic Shell protection technique 110 consists of two major phases of operation—an analysis 120 phase where the standard executable binary 100 is used to initialize the data structures needed later in the process, and a reformulation phase that uses the output of the analysis phase to generate a protected program 140. This starts with an analysis and decompilation 121 step which identifies the overall program structure and the individual components that may be useful for reformulation, and in some embodiments, produces an intermediate representation that is not directly tied to the target hardware platform, allowing for generalized analysis techniques. In some embodiments, the intermediate representation is a custom data structure used internally within Magic Shell to capture all analysis results and metadata. In some embodiments, the magic shell intermediate representation is exported using the same data format as used by commercial and open source compiler tool chains such as GCC or LLVM. It is also possible and reasonable to export the intermediate representation into a documentation and report view. The second remap and subdivide 122 step then generates mappings between these components, identifies modules of related code, and otherwise provides the necessary data structures to guarantee correctness in the later processes.

In reformulation phase 130, the actual binary structure is rearranged, recoded, and recompiled for, in various embodiments, benefits including increased performance, increased apparent complexity, and difficulty in adversarial analysis. This initially begins with optimization and obfuscation 131 where the decompiled results are replaced with effectively equivalent operations. Once optimization and obfuscation is complete, the reformulation proceeds to the recompile 132 step which generates a new set of platform-specific instructions from the intermediate representation.

Now that all protected executable binary modules are available, they are relinked to produce the protected program 140, an executable that targets the host architecture and operating system that is functionally equivalent to the original executable binary 100. In some embodiments, portions of the original standard executable binary 100 are discarded because they are no longer needed for correct execution. In some embodiments, additional code and data is added to provide contradictory information to defeat adversarial analysis.

Figure 2:
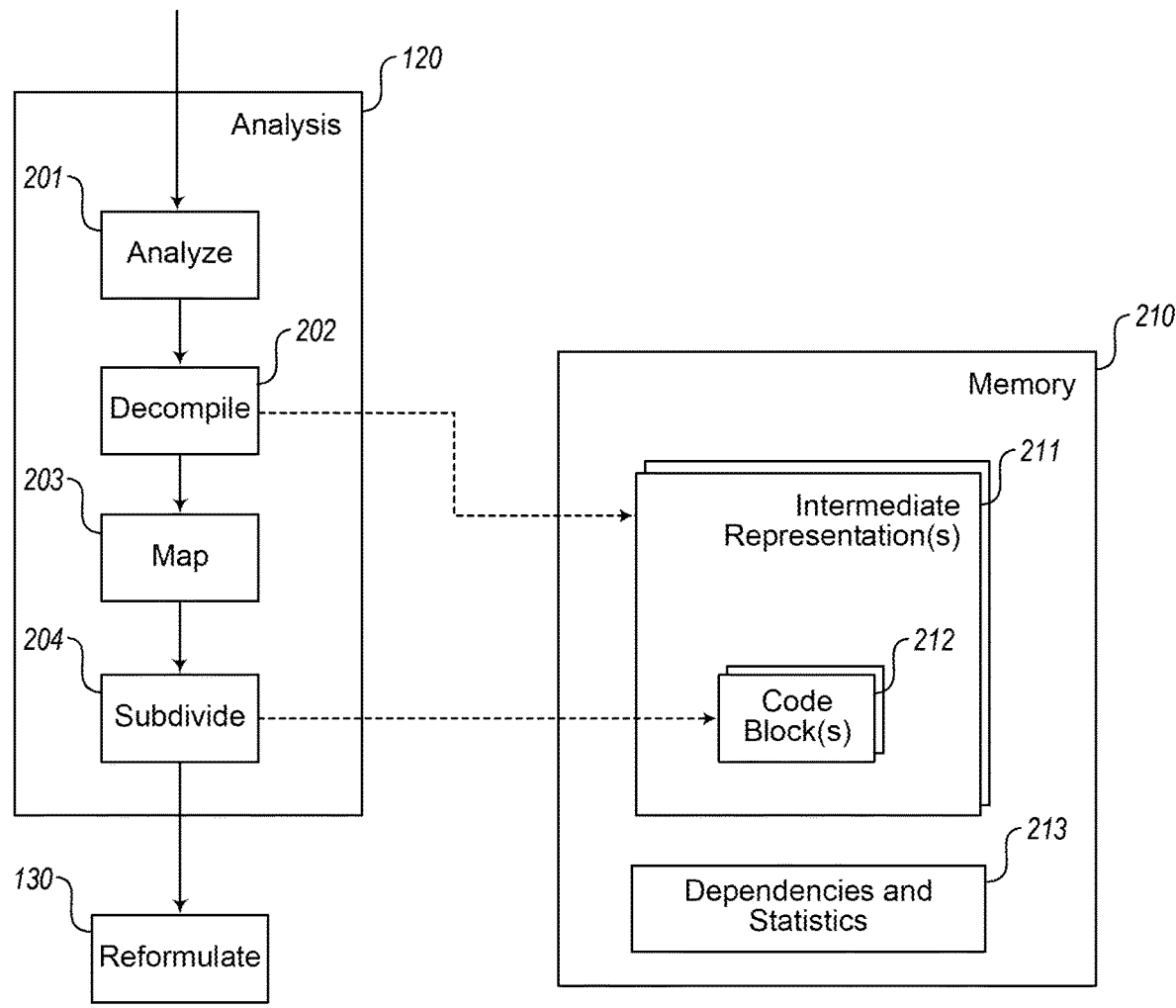
FIG. 2 is a flow diagram showing the process used by the facility to analyze a program in order to prepare for reformulation in some embodiments.

FIG. 2 is a flow diagram showing more details of the steps in analyze phase to describe the process used by the facility to analyze a program in order to prepare for reformulation in some embodiments.

FIG. 2 shows a more detailed representation of the analysis phase 120 from FIG. 1. The standard executable binary is provided as input into the analyze 201 step. Here, in at least some embodiments, the system architecture is identified, including Instruction Set Architecture (ISA), host Operating System (OS), calling conventions for functions, procedures, and other subroutines, entry points, public/shared procedure calls, dynamically linked libraries, and other useful details about the binary that was presented for reformulation.

The next step is to decompile 202 the binary, finding individual subroutines, their associated parameters, local memory allocations, and to generate an equivalent intermediate representation for later processing. Original instructions may, in some embodiments, be retained as a means to provide the data necessary to facilitate a later process to reverse the reformulation techniques for cooperative analysis such as developmental debugging. In some embodiments, the original instructions will not be provided as part of resulting protected binary, in order to maximize the difficulty for adversarial analysis.

With the intermediate representation data structures now available, the map 203 step provides cross-referencing to ensure runtime accuracy when varying the actual binary data and executable code, which in some embodiments affects the start and end addresses of the code in memory. This mapping also allows static analysis of runtime dependencies between subroutines and some basic statistic gathering. These dependencies and statistics are used by the subdivide 204 step while it determines the nature of code blocks in the executable, either as basic blocks with no branches or subroutine calls, branch and loop logic that is self-contained, and subroutines such as function, procedure, or object method calls.

As the analysis proceeds, system memory 210 is updated to hold the state of the analysis process. Initially, decompile 202 will allocate one or more blocks of memory to be used for intermediate representations 211 of the code. Once allocated, the overall executable and data is transferred directly into memory and in some embodiments replaced or conjoined with the equivalent intermediate representation of the code. As map 203 and subdivide 204 steps are executed, code blocks 212 are identified and arranged such that a future reformulation step will be able to maintain correctness guarantees on the code. Throughout the entire process, the dependencies and statistics data structure 213 is managed.

Upon completion of the analysis phase, control is passed to the reformulate step 130, where the intermediate representation(s) and associated data structures are passed along for the later code manipulation.

Figure 3:
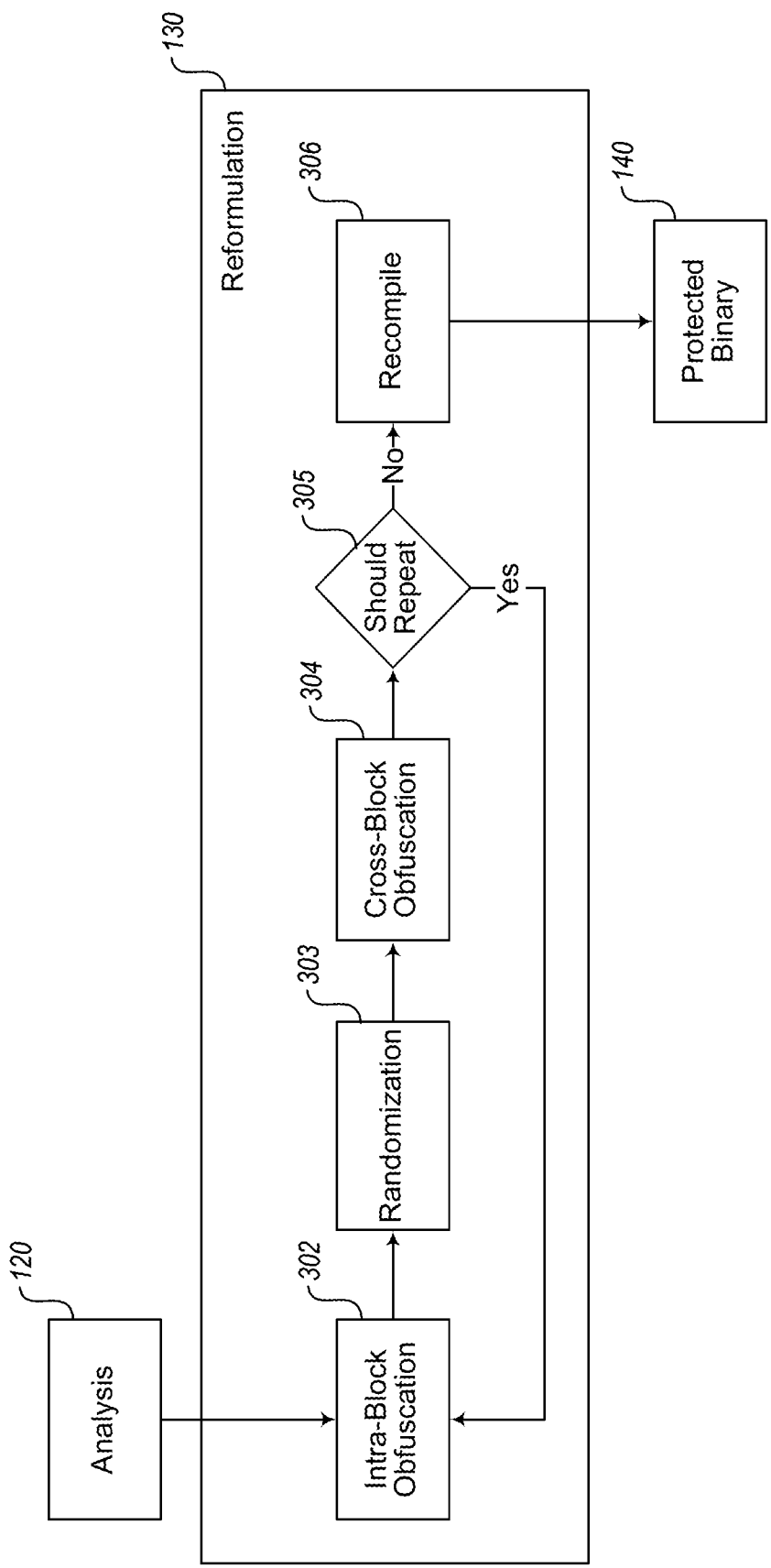
FIG. 3 is a flow diagram showing the reformulation process, including obfuscation and recompilation, performed by the facility in some embodiments.

FIG. 3 is a flow diagram showing the reformulation process, including obfuscation and recompilation, performed by the facility in some embodiments.

FIG. 3 shows a more detailed version of the reformulation phase 130 from FIG. 1. The output from Analysis 120 is used as an input to this process, where a detailed mapping between subroutines, data structures, and code paths is maintained, allowing for a guarantee of runtime correctness throughout the process.

The first step in the reformulation process is the intra-block obfuscation 302 step, in which the code block(s) identified during analysis and mapping are, in some embodiments, converted into equivalent code block(s) using obfuscation and optimization techniques. This process is described in greater detail below. Once obfuscation for the code block(s) is complete, the reformulation process proceeds to the randomization 303 step which in some embodiments alters the order in which code blocks will appear in memory, introduces non-executing code blocks, duplicates code blocks and arbitrarily updates code paths to use either copy, or performs other misdirection transformations to the code.

The logic then proceeds to cross-block obfuscation 304 where in some embodiments, multiple code blocks are combined together such that correctness for the overall program is maintained in the aggregate, even if an individual code block is converted into an incomplete subroutine. For example, one cross-block obfuscation introduces a modification such as an additive bias or multiplicative factor into calculation in one code block, and then inverts that modification in one or more other code block(s) such that the net result is unchanged but each individual code block now produces a locally incorrect result. Another example combines two otherwise unrelated code blocks into the same logic stream with the addition of conditional execution blocks to ensure correctness for both original code paths.

After completion of the intra-block and cross-block obfuscation processes, a test 305 is performed to determine if the obfuscation subprocess should be repeated. In various embodiments, this test considers, for example, how many code blocks were modified in the previous subprocess; if execution of an analysis phase would be able to generate an intermediate representation that is useful to adversarial analysis; a fixed number of loops through the subprocess; or be omitted entirely. Additional passes through the obfuscation subprocess has the net effect of increasing the complexity of the resulting code with the trade-offs of increasing the runtime of both the reformulation and of the resulting code. In some embodiments, these trade-offs are configured by the user of the magic shell protection system.

When no additional repeats of the obfuscation subprocess are needed, reformulation proceeds to the recompile 306 step where all of the intermediate representation code block(s), including some unreachable or distracting code paths introduced by the reformulation process, are compiled for the target ISA and OS. In some embodiments, this compilation process is separately mapped to the original machine code to permit cooperative analysis such as developmental debugging. In the embodiments that permit cooperative analysis, the mapping of original to protected code logic is emitted as a stand-alone metadata store, and is not included in the protected binary.

Once reformulation is complete, the Protected Binary 140 is generated by linking the recently recompiled modules with any necessary static and/or dynamic linking into other shared modules and libraries provided by the target OS. In some embodiments, other Magic Shell processing such as Dynamic Encryption, described in U.S. Provisional Patent Application No. 63/354,468, is performed at this time.

Figure 4:
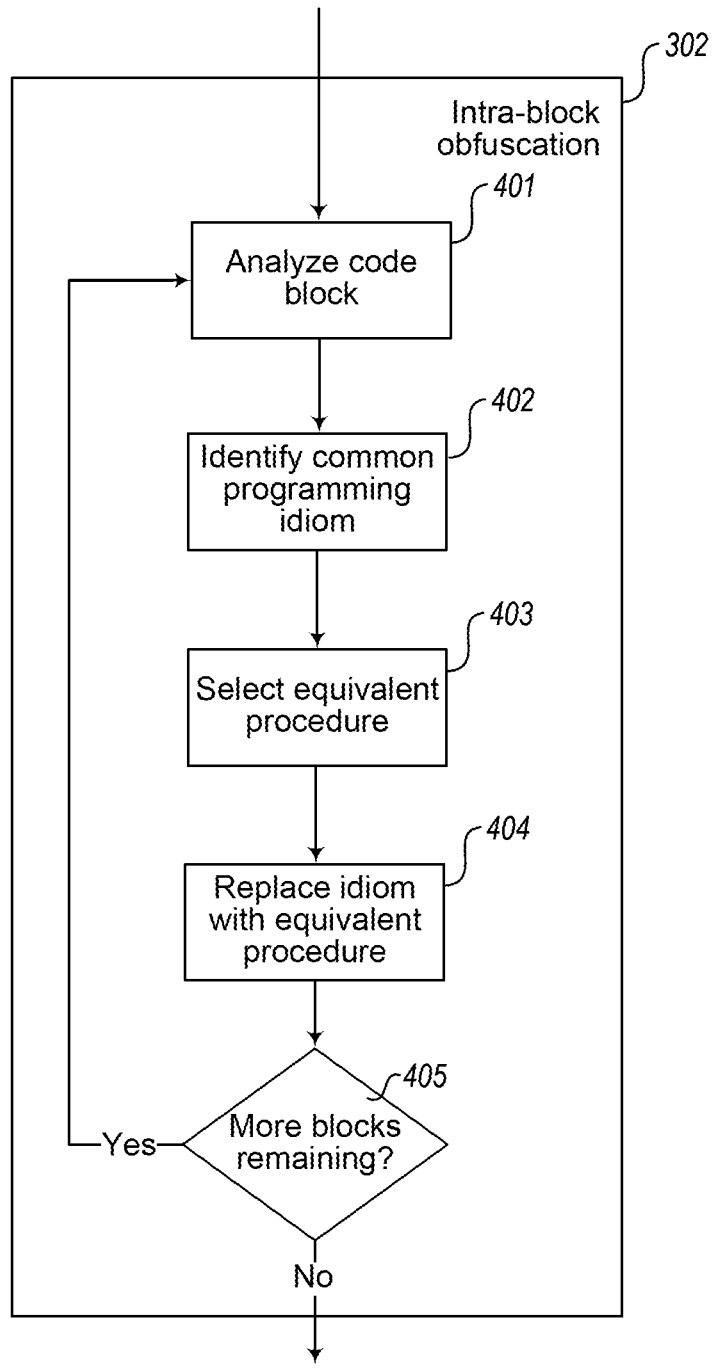
FIG. 4 is a flow diagram showing details of intra-block obfuscation performed by the facility in some embodiments.

FIG. 4 is a flow diagram showing details of intra-block obfuscation performed by the facility in some embodiments.

FIG. 4 shows a more detailed version of the Intra-block obfuscation 302 step from FIG. 3. The input to this step is either the output from Analysis 120 or the current state of Reformulation 130 for repeated execution as shown in FIG. 3. In some embodiments, intra-block obfuscation process 302 operates on a single code block 212 (from FIG. 2) at a time.

Initially, the code block is analyzed in step 401, in which the code block is in some embodiments reviewed to find local variables, conditional logic, looping structures, mathematical control flow, exception handling, and subroutine/procedure calls. At this point, potential common programming idioms 402 are generalized and identified, allowing the obfuscation logic to potentially select alternative procedure(s) 403.

In some embodiments, the common logic idioms have multiple one-to-one replacements, such as a for loop being replaced with an equivalent do or while loop. Procedure calls can be introduced to replace loop bodies, or else procedure calls can be rearranged to be inline with the calling code.

Other common idioms can be replaced with multiple basic blocks assembled in sequence, such as a process in which a mathematical bias is applied, an equivalent procedure is executed, and then the bias is removed. In some embodiments, these alternatives are selected such that they do not obviously map back to either the original source code or to other common procedural programing signatures.

Additionally, some of the alternatives may have improved performance characteristics on the target platform, such as processing a loop counter from max to min values, enhancing the use of comparison to zero and negative numbers or a loop being unrolled to avoid repeated conditional tests when the result is not in doubt. In some embodiments, a level of randomness is used during the selection the equivalent idioms to ensure that similar common programming idioms from the original program are converted into different equivalent idiom alternatives.

A few of the possible common programming idioms and alternative equivalent idioms are to: Change arithmetic and logical operations to more complex but equivalent expressions; Reorder and interleave logic with unrelated code; Add branch logic that does not execute; Add duplicate functions with different protections applied and alternate function calls to stimulate complexity; Inline, Split, or Merge functions to change the apparent complexity.

Once the generalized equivalent procedure is selected, it is then transformed into the original code block in act 404. In this process, local variables are reconstituted into the generalized block, static and dynamic linking data structures are updated, and other correctness guarantees are maintained. Upon completion, the obfuscation process performs test 405 to determine if additional code blocks remain and require processing. If so, the next block is processed by act 401, else intra-block obfuscation process 302 concludes and control is passed to randomization 303 shown in FIG. 3, and described above.

Figure 5:
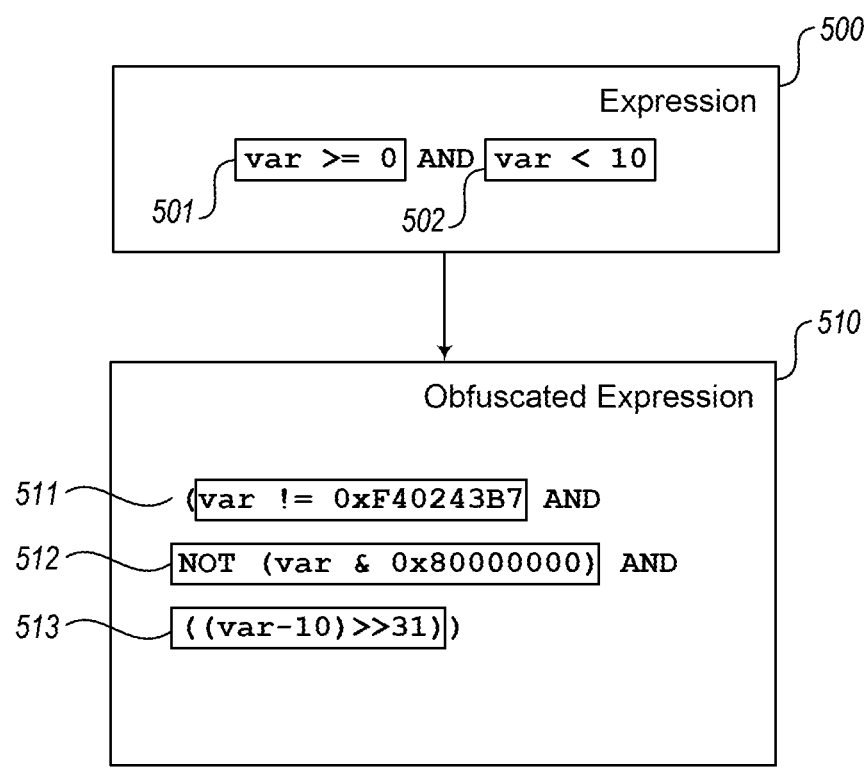
FIG. 5 is a diagram showing sample obfuscation results produced by the facility in some embodiments.

FIG. 5 is a diagram showing sample obfuscation results produced by the facility in some embodiments for a best expression.

For example, a test expression 500 may be used in an expression such as an if conditional logic statement or a while loop guard condition. The example involves a 32 bit signed integer variable "var". The conditional logic consists of two sub-tests that are combined together using the Boolean AND operation. The first test 501 verifies that var is a non-negative value by checking for greater-than or equals to zero. The second test 502 checks that the value is less than 10.

In some embodiments, the obfuscation operation generates a sample resulting obfuscated expression 510. The first logical condition 511 is a piece of distraction logic that adds a comparison to an arbitrary value that is outside the valid range for the type of the var variable, forcing an adversarial analyst to consider why this otherwise irrelevant value may be important. The second conditional block 512 tests that the number is not negative by looking at the sign bit directly through a process of masking out the 2's complement binary encoding of zero and testing for non-zero using the NOT operation. The third logical condition 513 verifies that a subtraction of 10 will turn the sign bit negative by shifting all value bits away and looking only at the sign bit, thus ensuring that the value of var is an integer less than 10. When taken in aggregate, the replacement conditions do verify that the value of var is in the range of 0-9 while avoiding the use of greater-than and less-than operators altogether.

Figure 6:
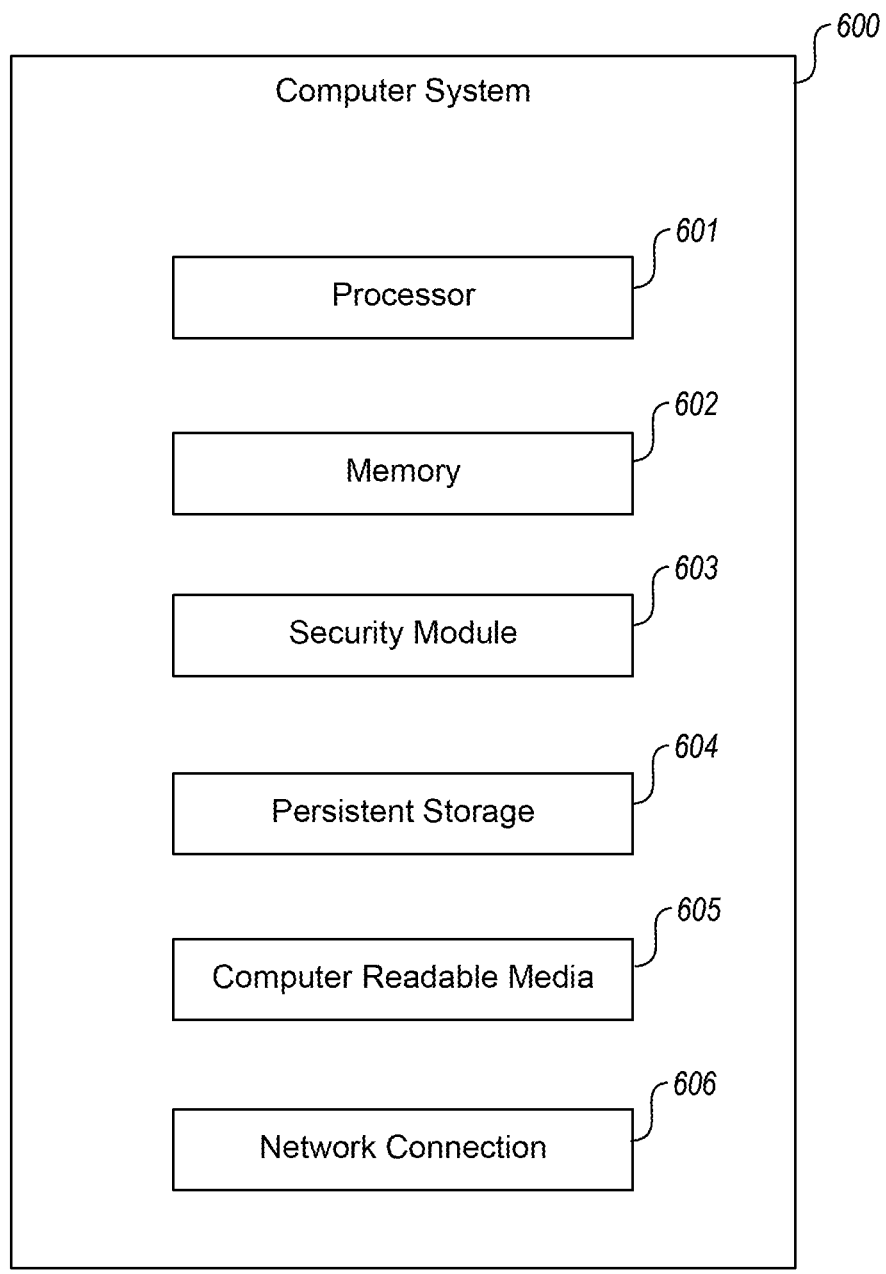
FIG. 6 is a block diagram showing some of the components typically incorporated in at least some of the computer systems and other devices on which the facility operates.

One skilled in the art can see that many possible obfuscated expressions are possible, and that this example is merely representative of the process of converting a conditional logic idiom into a more complex form that is functionally equivalent. Additional steps may be added by the actual program to obfuscate the logical constants FIG. 6 is a block diagram showing some of the components typically incorporated in at least some of the computer systems and other devices on which the facility operates.

In various embodiments, these computer systems and other devices 600 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 601 for executing computer programs and/or training or applying machine learning models, such as a CPU, GPU, TPU, NNP, FPGA, or ASIC; a computer memory 602 for storing programs and data while they are being used, including the facility and associated data, an operating system including a kernel, and device drivers; a hardware supported security module 603 with trusted cryptography support; a persistent device 604, such as a hard drive or flash drive for persistently storing programs and data; a computer-readable media drive 605, such as a floppy, CD-ROM, or DVD drive, for reading programs and data stored on a computer-readable medium; and a network connection 606 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

CONCLUSION

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, comprising:
accessing a first executable representation of a program;
decompiling the first executable representation of the program to obtain an intermediate representation of the program;
using the intermediate representation to construct a logic tree representing a logical flow of the program;
mapping the logic tree to identify modules within the intermediate representation;
subdividing the intermediate representation into the identified modules;
obfuscating the intermediate representation of the program; and
recompiling the obfuscated intermediate representation of the program to obtain a second executable representation of the program.

2. The method of claim 1, further comprising:
using at least one performance optimization technique to alter the intermediate representation,
wherein it is the altered intermediate representation that is obfuscated.

3. The method of claim 2 wherein the at least one performance optimization comprises any of loop unrolling, dead assignment elimination, deferred variable assignment, and stack-based allocation.

4. One or more computer memories having contents configured to cause a computing system to perform a method, the method comprising:
decompiling an executable version of a program to obtain a first representation of the program;
accessing the first representation of the program;
performing an obfuscating alteration to the first representation of the program to obtain a second representation of the program in which a first portion differs from the first representation;
performing an obfuscating alteration to the second representation of the program to obtain a third representation of the program in which a second portion within the first portion differs from the second representation; and
storing the third representation.

5. The one or more computer memories of claim 4, the method further comprising:
before performing the obfuscating alteration to the first representation of the program, subdividing the first representation into a plurality of blocks, wherein the first portion is fully contained by a single one of the blocks.

6. The one or more computer memories of claim 4, the method further comprising:
before performing the obfuscating alteration to the first representation of the program, subdividing the first representation into a plurality of blocks,
wherein the second portion spans at least two of the blocks.

7. The one or more computer memories of claim 6 wherein a first block of the at least two of the blocks is altered to perform a selected transformation of an element of state accessed by the program in its first representation, and
wherein a second block of the at least two of the blocks is altered to perform an inverse of the selected transformation to the element of state.

8. The one or more computer memories of claim 4, the method further comprising:
before performing the obfuscating alteration to the first representation of the program, subdividing the first representation into a plurality of blocks,
wherein the obfuscating alteration performed to the first representation of the program comprises reordering the plurality of blocks from a first order to a second order.

9. The one or more computer memories of claim 4 wherein the obfuscating alteration performed to the first representation of the program comprises adding to the first portion unreachable logic.

10. The one or more computer memories of claim 4 wherein the obfuscating alteration performed to the first representation of the program comprises adding to the first portion logic that executes without altering any element of state accessed by the program in its first representation.

11. The one or more computer memories of claim 4 wherein the obfuscating alteration performed to the first representation of the program comprises adding to the first portion logic that executes to alter an element of state not accessed by the program in its first representation.

12. The one or more computer memories of claim 4 wherein the obfuscating alteration performed to the first representation of the program comprises:
   accessing a resource specifying programming idioms and one or more equivalent idioms for each;
   identifying in the first representation of the program one of the programming idioms specified by the resource;
   selecting an equivalent programming idiom specified for the identified programming idiom by the resource; and
   in the second representation of the program, replacing the identified programming idiom with the selected programming idiom.

13. The one or more computer memories of claim 4 wherein the obfuscating alteration performed to the first representation of the program comprises:
   selecting a first expression in the first representation of the program that uses a first operation to produce a result from a first starting state;
   constructing a second expression that, for each valid value of the first starting state, produces a second result equal to the first result, the second expression using a second operation and not using the first operation; and
   in the second representation of the program, substituting the second expression for the first expression.

14. The one or more computer memories of claim 4, the method further comprising:
   compiling the third representation of the program to obtain an executable version of the program.

15. One or more instances of computer-readable media computer memories collectively having contents configured to cause a computing system to perform a method, the method comprising:
   accessing a first executable representation of a program;
   decompiling the first executable representation of the program to obtain an intermediate representation of the program;
   using the intermediate representation to construct a logic tree representing a logical flow of the program;
   mapping the logic tree to identify modules within the intermediate representation;
   subdividing the intermediate representation into the identified modules;
   obfuscating the intermediate representation of the program; and
   recompiling the obfuscated intermediate representation of the program to obtain a second executable representation of the program.

16. The one or more computer memories of claim 15, further comprising:
   using at least one performance optimization technique to alter the intermediate representation,
   wherein it is the altered intermediate representation that is obfuscated.

17. The one or more computer memories of claim 16 wherein the at least one performance optimization comprises any of loop unrolling, dead assignment elimination, deferred variable assignment, and stack-based allocation.

18. A method in a computing system comprising:
   decompiling an executable version of a program to obtain a first representation of the program;
   accessing the first representation of the program;
   performing an obfuscating alteration to the first representation of the program to obtain a second representation of the program in which a first portion differs from the first representation;
   performing an obfuscating alteration to the second representation of the program to obtain a third representation of the program in which a second portion within the first portion differs from the second representation; and
   storing the third representation.

19. The method of claim 18, further comprising:
   before performing the obfuscating alteration to the first representation of the program, subdividing the first representation into a plurality of blocks,
   wherein the first portion is fully contained by a single one of the blocks.

20. The method of claim 18, further comprising:
   before performing the obfuscating alteration to the first representation of the program, subdividing the first representation into a plurality of blocks,
   wherein the second portion spans at least two of the blocks.

21. The method of claim 20 wherein a first block of the at least two of the blocks is altered to perform a selected transformation of an element of state accessed by the program in its first representation,
   and wherein a second block of the at least two of the blocks is altered to perform an inverse of the selected transformation to the element of state.

22. The method of claim 18, further comprising:
   before performing the obfuscating alteration to the first representation of the program, subdividing the first representation into a plurality of blocks,
   wherein the obfuscating alteration performed to the first representation of the program comprises reordering the plurality of blocks from a first order to a second order.

23. The method of claim 18 wherein the obfuscating alteration performed to the first representation of the program comprises adding to the first portion unreachable logic.

24. The method of claim 18 wherein the obfuscating alteration performed to the first representation of the program comprises adding to the first portion logic that executes without altering any element of state accessed by the program in its first representation.

25. The method of claim 18 wherein the obfuscating alteration performed to the first representation of the program comprises adding to the first portion logic that executes to alter an element of state not accessed by the program in its first representation.

26. The method of claim 18 wherein the obfuscating alteration performed to the first representation of the program comprises:
   accessing a resource specifying programming idioms and one or more equivalent idioms for each;
   identifying in the first representation of the program one of the programming idioms specified by the resource;
   selecting an equivalent programming idiom specified for the identified programming idiom by the resource; and in the second representation of the program, replacing the identified programming idiom with the selected programming idiom.

27. The method of claim 18 wherein the obfuscating alteration performed to the first representation of the program comprises:
selecting a first expression in the first representation of the program that uses a first operation to produce a result from a first starting state;
constructing a second expression that, for each valid value of the first starting state, produces a second result equal to the first result, the second expression using a second operation and not using the first operation; and
in the second representation of the program, substituting the second expression for the first expression.

28. The method of claim 18, further comprising:
compiling the third representation of the program to obtain an executable version of the program.

\* \* \* \* \*